Sept. 19, 1950      J. H. CADDELL      2,522,988
OIL GAUGE
Filed May 19, 1949      2 Sheets-Sheet 1
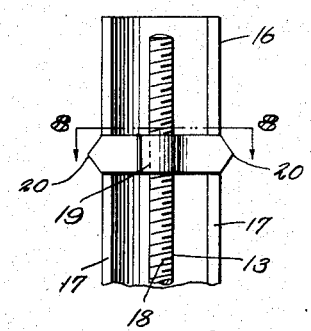
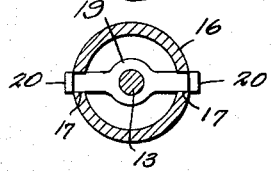
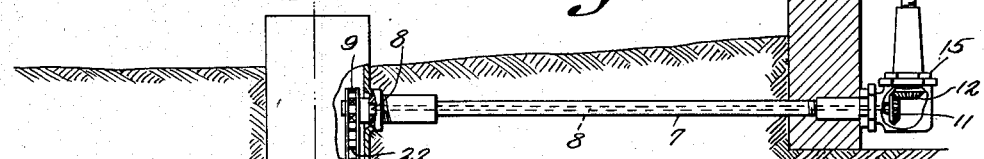
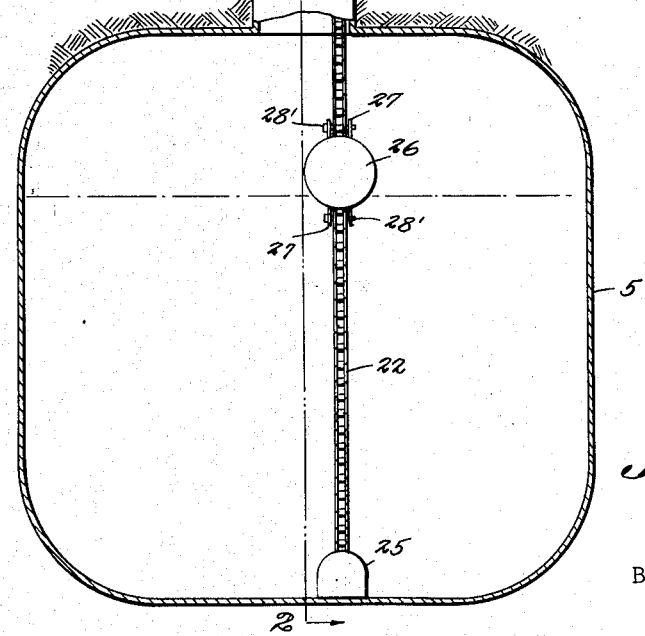
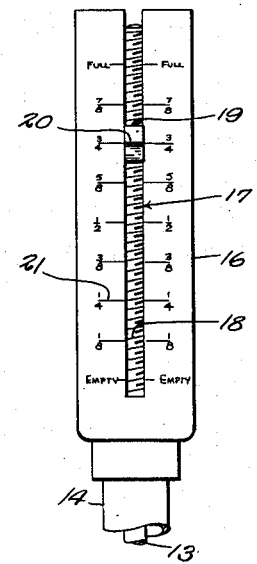
J. H. Caddell
INVENTOR
BY C. A. Snow & Co.
ATTORNEYS.

Sept. 19, 1950  J. H. CADDELL  2,522,988
OIL GAUGE
Filed May 19, 1949  2 Sheets-Sheet 2
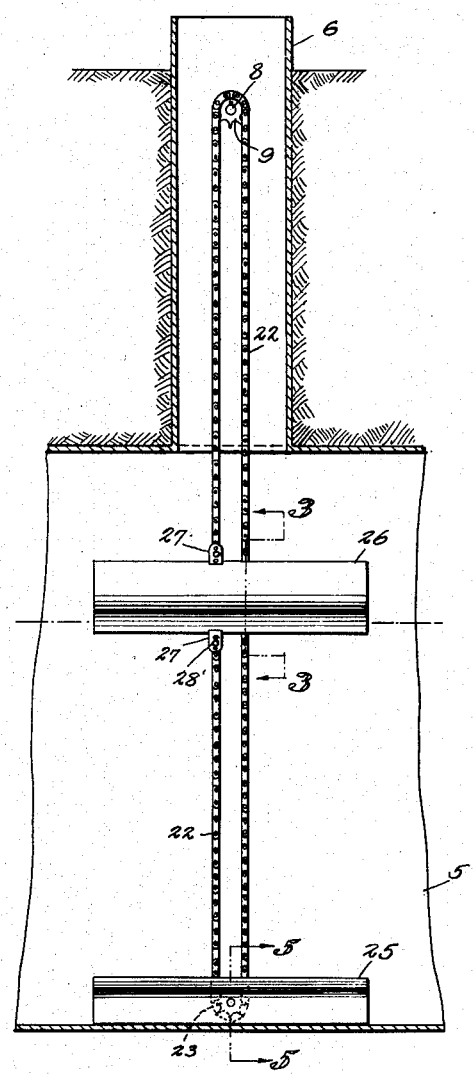
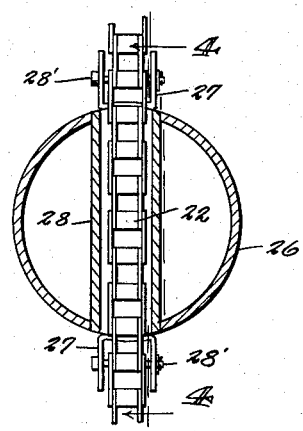
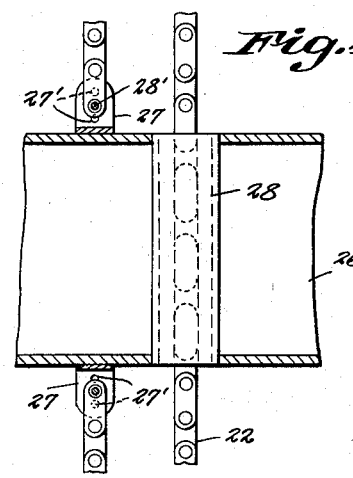
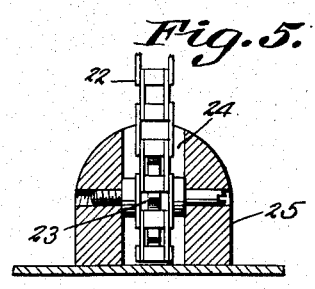
J. H. Caddell
INVENTOR
BY C. A. Snow & Co.
ATTORNEYS.

Patented Sept. 19, 1950

2,522,988

UNITED STATES PATENT OFFICE 2,522,988

OIL GAUGE

James H. Caddell, Richmond, Va.

Application May 19, 1949, Serial No. 94,131

4 Claims. (Cl. 73—321)

The present invention has reference to an oil gauge, designed for use in indicating the oil level in a fuel tank.

The primary object of the invention is to provide an oil gauge which may be readily and easily installed in fuel oil tanks now in common use, eliminating the necessity of making extensive changes in the fuel oil tank construction, to install the gauge.

An important object of the invention is to provide an oil gauge of this character including an endless chain with means for holding the chain for operation in a vertical plane, the holding means being in the form of a weight that is dropped into the tank and rests on the bottom of the tank.

Another important object of the invention is to provide a chain operated gauge including a float which is secured to one flight of the endless chain, the float being capable of movement to a position in substantially parallel relation with the chain, so that it may be passed into a restricted pipe or opening of the tank, when installing the gauge.

With the foregoing and other objects in view which will appear as the description proceeds, the invention consists of certain novel details of construction and combinations of parts hereinafter more fully described and pointed out in the claims, it being understood that changes may be made in the combination and arrangement of parts without departing from the spirit of the invention as claimed.

Referring to the drawings:

Figure 1 is a view illustrating a tank for containing oil, as equipped with a gauge, constructed in accordance with the invention.

Fig. 2 is a sectional view taken on line 2—2 of Fig. 1.

Fig. 3 is a sectional view taken on line 3—3 of Fig. 2.

Fig. 4 is a sectional view taken on line 4—4 of Fig. 3.

Fig. 5 is a sectional view taken on line 5—5 of Fig. 2.

Fig. 6 is an elevational view illustrating the indicator and graduations on the indicator support, with which the indicator cooperates.

Fig. 7 is a vertical sectional view through the indicator support.

Fig. 8 is a sectional view taken on line 8—8 of Fig. 7.

Referring to the drawings in detail, the reference character 5 indicates a fuel oil tank, which is usually located an appreciable distance from the house or building in which the burner which is being supplied with fuel from the tank, is located.

The tank includes the usual filling pipe 6, which extends to the ground surface so that access to the interior of the tank for filling purposes may be had.

Connected with the pipe 6 is the tube 7 in which the shaft 8 operates, one end of the shaft 8 extending into the pipe 6, where it is provided with a sprocket 9 that is secured to the shaft 8 to rotate therewith.

The opposite end of the shaft 8 extends beyond the inner surface of the wall 10 of the building, this end of the shaft being provided with the gear 11, that meshes with the gear 12, secured to the shaft 13, which is supported within the tubular housing 14, which is secured to the gear housing 15 at the base of the tubular housing 14, as shown by Fig. 1 of the drawings.

Secured to the upper end of the tubular housing 14 is the indicator support 16, which has its wall formed with slots 17 that extend downwardly from the free end of the indicator support 16, terminating at points adjacent to the upper end of the tubular housing 14. The upper end of the shaft 13 is threaded at 18 and provides a support for the indicator 19 which is in the form of a bar provided with a threaded opening through which the threaded end of the shaft 13 extends, the ends of the indicator bar being pointed at 20, the pointed ends of the indicator bar falling opposite to the graduations 21, formed on the indicator support 16, indicating the movements of the shaft 13.

Operating over the sprocket 9, is the endless chain 22, which endless chain operates over the sprocket 23, which is mounted within the recess 24 formed intermediate the ends of the weight 25, which is in the form of a bar having a flat lower surface designed to rest squarely on the bottom of the tank, as shown by Fig. 2. This weight holds the lower portion of the chain steady, to prevent binding between the chain and sprockets over which it moves, to impair the accurate operation of the gauge.

The reference character 26 indicates the float which is adjustably connected to one flight of the chain, by means of the ears 27, that are secured to the float, the ears being provided with spaced openings 27' through which the pins 28' extend, the pins 28' being also connected with the links of the chain. The float 26 is also provided with a tube 28 that extends therethrough, the ends of the tube being open to permit the passage of one flight of the chain therethrough, the tube acting as a guide for the chain. Due to this construction, it will be seen that the float may be moved to a position in substantially parallel relation with the chain 22 so that it may be inserted into the tank, through the pipe 6, the float being of such a construction that when it reaches the oil level within the tank, the float will assume a horizontal position on the surface of the oil, as shown by Fig. 2.

Should it be desired to remove any of the elements of the gauge, it is only necessary to pull the chain 22 and insert a tool or instrument into the tank, moving the float and weight to substantially vertical positions where they may be slid endwise through the pipe 6.

From the foregoing it will be seen that with the rise and fall of the float, the chain 22 will be moved over the sprocket 9, rotating the shaft 8, which in turn transmits movement to the shaft 13 mounted on the housing 14, which shaft operating through the threaded opening of the indicator 19, causes the indicator to move longitudinally through the slots 17, the ends of the indicator falling opposite to the graduations indicated on the indicator support 16, thereby gauging the quantity of oil in the tank 5.

It is contemplated to position the pipe 14 in such a way that it may be conveniently observed in making readings, without the necessity of the person leaving the building in which the indicator is located.

It will also be noted that with this structure, the usual fuel oil tank may be readily equipped with an oil gauge, without the necessity of making extensive alterations in the fuel tank construction, to install the device.

Having thus described the invention, what is claimed is:

1. A liquid level gauge for oil tanks of the type having a filler pipe comprising a horizontal main shaft, extending into the upper end of the filling pipe and on which a sprocket is secured, a weight bar, a sprocket mounted intermediate the ends of the bar and operating within an opening formed in the bar, an endless chain operating over the sprockets, an elongated float secured to one flight of the endless chain, a tube extending through the float and through which the opposite flight of the endless chain operates as the float rises and falls with the oil level in the tank, whereby said shaft is operated, and a second shaft and indicator operated by said main shaft.

2. A liquid level gauge for oil tanks of the type having a filler pipe comprising a horizontal main shaft, extending into the upper end of the filling pipe and on which a sprocket is secured, a weight bar, a sprocket mounted intermediate the ends of the bar and operating within an opening formed in the bar, an endless chain operating over the sprockets, an elongated float secured to one flight of the endless chain, said float having an opening through which the opposite flight of the chain operates as the float rises and falls with the oil level within the tank, whereby the shaft is operated, and indicating means operated by the main shaft.

3. A liquid level gauge for oil tanks of the type having a filler pipe comprising a horizontally disposed main shaft extending into the filling pipe, a sprocket on the shaft disposed within the filling pipe, an endless chain operating over the sprocket, a weighted member, a sprocket mounted on the weighted member, over which the chain operates, said weighted member being positioned within the tank resting on the bottom of the tank, holding the chain taut, a float secured to one flight of the chain, the float resting on the surface of the oil in the tank, said float moving the chain over the sprockets operating the main shaft, and an indicator operated by the rotation of the main shaft.

4. A liquid level gauge for oil tanks of the type having a filler pipe comprising a horizontally disposed main shaft extending into the filling pipe, a sprocket on the shaft disposed within the filling pipe, an endless chain operating over the sprocket, and a weight having a flat bottom, positioned in the tank through the filling pipe, the flat bottom of the weight resting on the bottom of the tank, a sprocket mounted on the weight over which the chain moves, a float adjustably connected to one side of the chain, said float having an opening disposed parallel with the chain and through which the opposite flight of the chain moves, said float moving the chain and sprockets, rotating the main shaft, and an indicating member operated by the main shaft.

JAMES H. CADDELL.

REFERENCES CITED

The following references are of record in the file of this patent:

UNITED STATES PATENTS

| Number | Name | Date |
|---|---|---|
| 1,270,655 | Page | June 25, 1918 |
| 1,585,382 | Haigh et al. | May 18, 1926 |
| 1,928,620 | Eynon | Oct. 3, 1933 |